United States Patent
Osburn, III et al.

(10) Patent No.: US 7,747,710 B1
(45) Date of Patent: Jun. 29, 2010

(54) SYSTEM FOR DETECTING CHANGES IN PRESELECTED MEASURABLE CONDITIONS

(75) Inventors: Douglas C. Osburn, III, Houston, TX (US); John D. Cannoy, Long Beach, MS (US)

(73) Assignee: DJ Inventions, LLC, Houston, TX (US)

(*) Notice: Subject to any disclaimer, the term of this patent is extended or adjusted under 35 U.S.C. 154(b) by 279 days.

(21) Appl. No.: 11/874,065

(22) Filed: Oct. 17, 2007

Related U.S. Application Data

(63) Continuation-in-part of application No. 11/345,759, filed on Feb. 2, 2006, now abandoned, and a continuation-in-part of application No. 11/829,051, filed on Jul. 26, 2007, now Pat. No. 7,673,337.

(60) Provisional application No. 60/649,795, filed on Feb. 3, 2005.

(51) Int. Cl.
*G06F 15/177* (2006.01)
(52) U.S. Cl. .................. 709/220; 709/223; 709/224
(58) Field of Classification Search .................. 709/220, 709/223, 224
See application file for complete search history.

(56) References Cited

U.S. PATENT DOCUMENTS

| | | | |
|---|---|---|---|
| 5,719,771 A | 2/1998 | Buck et al. | |
| 6,658,349 B2 | 12/2003 | Cline | |
| 7,286,914 B2 | 10/2007 | Cerchione et al. | |
| 2002/0158776 A1* | 10/2002 | Lash et al. | 340/984 |
| 2004/0217900 A1 | 11/2004 | Martin et al. | |
| 2005/0122250 A1* | 6/2005 | Taylor | 342/41 |
| 2005/0138120 A1* | 6/2005 | Gundersen et al. | 709/204 |
| 2006/0191457 A1* | 8/2006 | Murphy | 114/253 |
| 2009/0212226 A1* | 8/2009 | Britton et al. | 250/370.07 |

* cited by examiner

*Primary Examiner*—John Follansbee
*Assistant Examiner*—Nghi V Tran
(74) *Attorney, Agent, or Firm*—Buskop Law Group, PC; Wendy Buskop

(57) ABSTRACT

A system for detecting changes in measureable conditions comprising: an enterprise server, at least one vessel, and a data broadcast device on the vessel. The broadcast device is in communication with a satellite. At least one remote terminal unit is on the vessel, and the remote terminal unit is in communication with an electronic cryptographic module. The remote terminal unit stores digital data in a memory area for transmission. Communication software, adapted to handle multiple telemetries and protocols, links the enterprise server directly with each vessel, collects digital data on changes in measureable conditions, and initiates an alarm when the digital data signifies a change outside a preset limit. Configuration software configures the remote terminal unit by executing configuration commands using the communication software. A broadcast device is disposed on each vessel, for enabling the remote terminal unit on each vessel to directly communicate with the enterprise server.

19 Claims, 4 Drawing Sheets

SYSTEM FOR DETECTING CHANGES IN PRESELECTED MEASURABLE CONDITIONS

CROSS REFERENCE TO RELATED APPLICATIONS

This application claims priority as a continuation-in-part application to co-pending U.S. Non-Provisional application Ser. No. 11/345,759 filed on Feb. 2, 2006. This Application also claim priority as a continuation-in-part application to co-pending U.S. Non-Provisional application Ser. No. 11/829,051 filed on Jul. 26, 2007. A related but patentable distinct application, entitled "Method For Detecting Changes In Measurable Conditions" is being filed concurrently with this Application.

FIELD

The present embodiments relate to a system for detecting changes in measureable conditions using communications for a supervisory control and data acquisition system.

BACKGROUND

A need exists for a system that can communicate with vessels through different telemetry methods and protocols, enabling communication to vessels from different countries and manufacturers that utilize different protocols.

A need exists to track and monitor individual containers on ships or other transport vessel to prevent terrorist pirates from sneaking onboard a vessel, adding a small container and blowing up the ship.

A need has existed for a real time monitoring system of a fleet of vessels, such as a platoon of soldiers, a group of tanks, a bunch of attorney briefcases. The vessels can be large or small.

A need has existed for a real time monitoring system using remote terminal units that are constant communication, and which have different protocols and telemetry while permitting on line reconfiguration of the remote terminal unit, or removal of one of several remote terminal units, or insertion into the system, seamlessly of additional remote terminal units.

A need exists for a system that enables communication with vessels that works faster than traditional host systems.

A need exists for a system that can remain in continuous, on-line operation while components are activated, deactivated, or repaired.

A need also exists for a system that can communicate with vessels using different telemetry methods and protocols while selectively encrypting, decrypting, and securely transmitting messages, commands, data, responses, and measured digital data between an enterprise server and one or more vessels and/or remote terminal units.

A further need exists for a system capable of detecting changes in oceanic conditions, including ocean bottom environments, world wide or in a selected location.

The present embodiments meet these needs.

BRIEF DESCRIPTION OF THE DRAWINGS

The detailed description will be better understood in conjunction with the accompanying drawings as follows.

Figure 1:
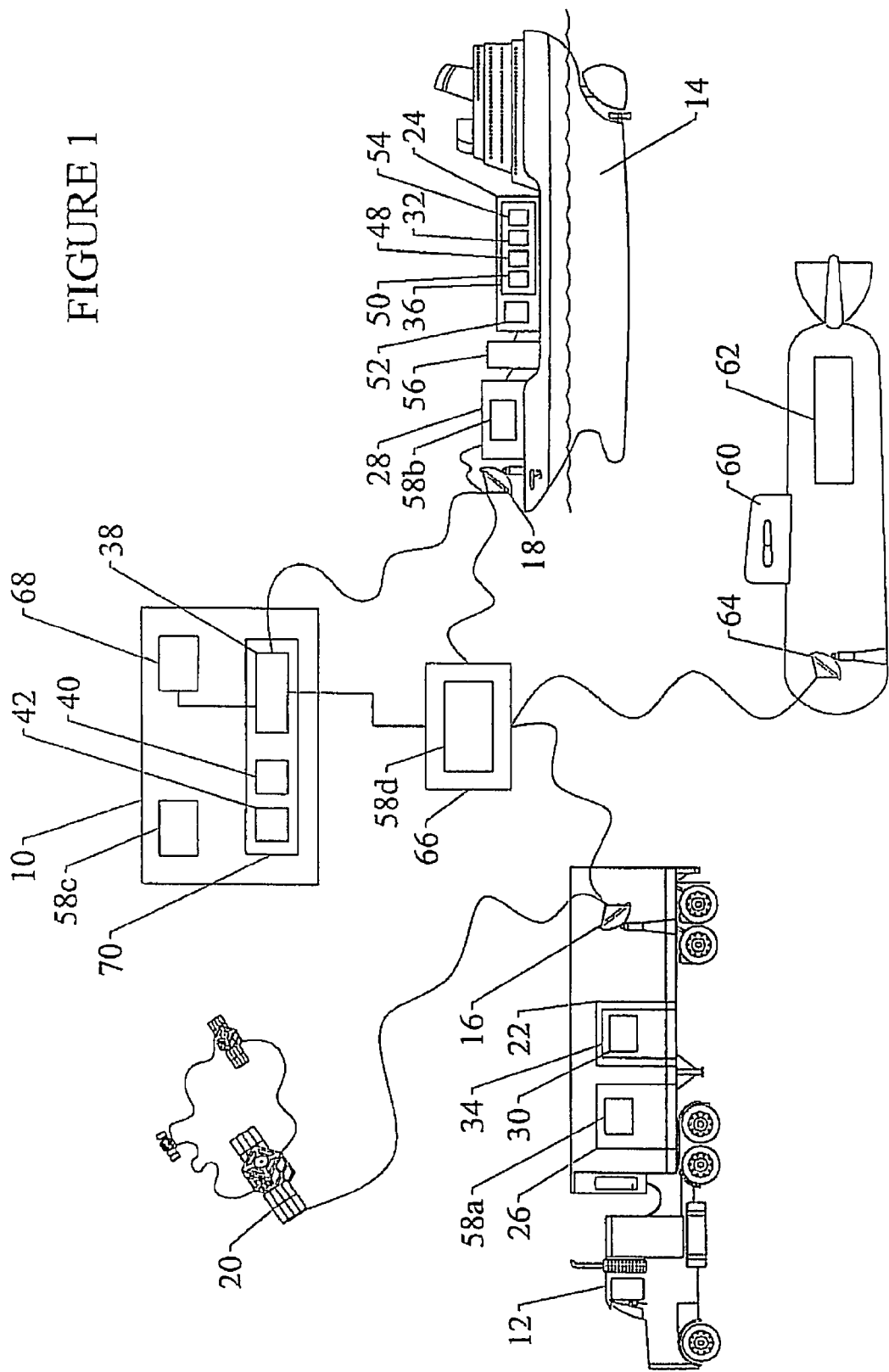
FIG. 1 depicts a diagram showing the components of an embodiment of the present system.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present system advantageously enables vessels and electronic devices, such as remote terminal units, that utilize differing telemetry methods and protocols, to simultaneously collect measurements and other digital data and communicate this digital data to at least one enterprise server. The system can include several enterprise servers for monitoring change in specific measureable conditions. Vessels and remote terminal units manufactured in different countries, or made by different manufacturers can thereby communicate and be used simultaneously for collective purposes and operations.

The present system also beneficially enables vessels and remote terminal units to receive reconfiguration commands, requests for digital data, and other commands and digital data from the enterprise server, independent of the differing telemetry methods or protocols utilized by each vessel or remote terminal unit, and independent of the manufacturing specifications of the vessel or remote terminal unit. Using the present system, selective individual vessels or remote terminal units, or any combination of vessels or remote terminal units in communication with the enterprise server can be reconfigured at any time.

The present system further advantageously provides continuous, on-line communication with a plurality of vessels and/or remote terminal units. Additional vessels or remote terminal units can be added to the present system without interrupting communication between any of the existing components. Likewise, existing vessels or remote terminal units can be removed from the present system without interrupting communication between any remaining components. This continuous, on-line communication enables components of the present system to be repaired, replaced, or upgraded, while the enterprise server maintains seamless communication with each component.

The present system also incorporates an electronic cryptographic module, enabling the present system to provide enhanced security over conventional means. The present system is capable of mixed-mode transmissions, selectively encrypting and decrypting commands, and responses between the enterprise server and selected vessels or remote terminal units, while foregoing encryption between other selected vessels or remote terminal units when conservation of bandwidth is necessary.

The present system can be advantageously used to communicate with vessels, including military vessels, emergency vehicles, and transportation vessels, enabling a variety of vessels to be tracked and/or reconfigured, and enabling each vessel to communicate measured digital data, responses, and other data to the enterprise server. Thus, the present system can be used to facilitate military or emergency communications, prevent theft or destruction of transported cargo, track commercial shipments, and perform numerous other applications in various industries, with the benefits of selective encryption and continuous, on-line communication and reconfiguration.

For example, the present system can enable multiple vehicles within a military transport convoy to be simultaneously tracked. An alarm can be provided when satellite contact with any of the vehicles is lost, when any of the vehicles deviates from a preselected course by a preset distance, when any of the vehicles is in danger of running out of fuel, when the vehicles reach a selected destination or midpoint, when the vehicles encounter inclement weather, or when any other measurable condition relating to one or more of the vehicles changes. Through use of the present system, loss, destruction, theft, vandalism, and accidents can be prevented.

Additionally, the present system could be used to remotely monitor an entire fleet of container ships carrying oil and/or natural gas, simultaneously, independent of the specific location of each individual ship, and independent of the differing manufacturers and technological specifications of each ship. An alarm can be provided when any of the container ships experience significant vibration that could result in an oil spill or explosion, when weather or oceanic conditions within the vicinity of a ship indicate a possible tsunami or hurricane, or when any other measurable conditions change beyond a preset limit.

The present embodiments relate to a system for detecting changes in measurable conditions, such as changes in temperature, pressure, sound, humidity, vibration, motion, light, and other similar conditions. Digital data regarding changes in certain preselected conditions can also include changes in the location of a vessel, changes in a vessel location relative to a predefined location or an identified secondary location, changes in location of the at least one vessel relative to a predefined position, changes in altitude and combinations thereof. The system uses communications for a supervisory control and data acquisition system, such as for pipelines for oil and gas transport.

The present system includes one or more enterprise servers, such as a Dell 2950 rack mounted server available from Dell of Round Rock, Tex. The enterprise server can include one or more power supplies, which can include alternating current sources, direct current sources, renewable power sources, rechargeable power sources, replaceable power sources, and combinations thereof. The enterprise server can further include one or more telemetry interfaces, such as a plain old telephone system (POTS) modem, radio interface, cellular network interface, fiber optic interface, infra-red, satellite, or Ethernet interface.

The enterprise server can further include one or more processors in communication with data storage. The server data storage can include protocol modules, such as a BSAP, a MODBUS, Emerson ROC protocols, or similar protocol modules, connection modules, such as a serial module, a dial-up module, or a TCP/IP module, and a server configuration database, such as an Oracle or Microsoft Access database, for restoring online configurations of the enterprise server when the server is reset.

The present system further includes one or more vessels. The term "vessel" can include any type of vehicle, individual, container, or object, such as a semisubmersible platform, a floating vessel, an armored vehicle, a moving vehicle, a deep draft cassion vessel, a ship, a truck, an automobile, a train, a plane, a person, a container on a vessel or vehicle, an animal, a bus, a fuel tank, a piece of equipment, or combinations thereof.

Each vessel is contemplated to include one or more data broadcast devices on the vessel in communication with one or more networks. The data broadcast devices can include radio frequency identification devices and transmitters, such as one made by AXcess of Carrolton, Tex., bar code readers and transmitters, such as Symbol laser readers Made by Motorola, of Oakland Calif., status switches, such as those made by made by Veris Industries™ of Portland Oreg., global positioning system receivers and transmitters, such as those made by Tom from the Netherlands, portable data acquisition systems, such as an EKG unit made by Hewitt Packard of California, acoustic recording devices, such as, vibration monitoring devices, video monitoring devices, other types of broadcast devices, and combinations thereof.

Data broadcast devices can also include sensors with transmitters that can communicate with a network such as pressure sensors; temperature sensors; salinity sensors; a hydrocarbon sensor; a radiation sensor; biometric sensors to read biometric data; a hazardous material sensor; such as a vapor sensor, a weight sensor; a distance sensor; a motion detecting radar sensor, such as Doppler radar; anemometers; accelerometers; altimeter; or combinations thereof. An exemplary data broadcast device can be a freeway broad band spectrum radio from Colorado.

It is contemplated that each data broadcast device can enable each vessel to be tracked. In an embodiment, each data broadcast device can also enable each vessel to communicate measured digital data and responses to commands directly to the enterprise server.

At least one remote terminal unit, such as an Autosol™ RTU 4000 from Houston, Tex., a Bristol Babcock 3330 RTU, an Emerson ROC 809, or a similar remote terminal unit, is contemplated to be on or in communication with each vessel for collecting digital data regarding measurable conditions and storing the digital data in a memory area for transmission.

The term "remote terminal unit" can also include other similar electronic devices, such as programmable logic controllers. Each remote terminal unit can include one or more processors and power sources. Each remote terminal unit is contemplated to communicate with the enterprise server, one or more vessels, one or more data broadcast devices, or combinations thereof when contacted.

In an embodiment, a single remote terminal unit can communicate with a plurality of data broadcast devices disposed on, near, or in one or more vessels.

Each remote terminal unit can be in communication with at least one intelligent electronic cryptographic module for selectively decrypting encrypted commands and messages from the enterprise server and selectively encrypting responses and measured digital data from the remote terminal unit.

The intelligent electronic cryptographic module can include one or more power sources and one or more processors in communication with data storage, which can include removable data storage. The intelligent electronic cryptographic module is contemplated to include a cryptography chip, such as a Spyrus Rosetta™, or a Spyrus Lynks™, made by Spyrus™ of San Jose, Calif. The cryptography chip provides the intelligent electronic cryptographic module with encryption and decryption capability.

In an embodiment, one or more electronic cryptographic modules can simultaneously function as a remote terminal unit, performing encryption and decryption functions in addition to performing the functions of a remote terminal unit. This dual functionality provides enhanced security by avoiding clear-text, non-encrypted transmissions between the intelligent electronic cryptographic module and the remote terminal unit.

It is contemplated that the enterprise server can include a server-side cryptography chip for decrypting encrypted digital data and responses from each remote terminal unit, or from the cryptographic module, and for selectively encrypting commands and requests for digital data transmitted to remote terminal units or cryptographic modules between the remote terminal units and at least one enterprise server on the system.

In a contemplated embodiment, one or remote terminal units can include an analog-to-digital converter, which can be a built in component, for converting measured digital data into one or more digital representations of the digital data. The remote terminal unit can also include a memory area for storing the digital representations.

The remote terminal unit can further include one or more processors in communication with the analog-to-digital converter for operating on the digital representations according to a predetermined function. The processor can selectively move the digital representations to the memory area.

The remote terminal unit can further include a command register for storing communication commands. The command register is contemplated to be in communication with the processor, enabling the processor to move digital representations to the memory area when the command register contains an enabling communication command.

It is contemplated that a communication command can include at least one request to change a control target, change an alarm threshold, change an alarm status, trigger a corrective action, or to communicate collected data. A control target is a value selected from a range of pressures, temperatures or other measurable conditions that the remote terminal unit acts to maintain for a vessel. An alarm threshold is a value selected from a range of pressures, temperatures or other measurable conditions beyond which an alarm condition is detected by the remote terminal unit. An alarm status is an equipment status such as operating or not operating, a comparison of values that is true or false, or a valve that may be open or closed, in which one or both states, or the transition from one state or another may be an alarm condition. Upon detecting an alarm condition the remote terminal unit may trigger a corrective action.

The remote terminal unit can also include one or more bidirectional ports, such as an interface for a radio, a modem, an Ethernet, a satellite, or similar interfaces, in communication with the communication software of the enterprise server, for transmitting digital representations to the enterprise server from the remote terminal unit via the communication software.

The remote terminal unit can further include a cryptography chip in communication with the processor for decrypting encrypted messages and commands from the enterprise server and selectively encrypting responses and digital representations from the remote terminal unit. Inclusion of a cryptography chip within a remote terminal unit allows the remote terminal unit to simultaneously function as both a remote terminal unit and an electronic cryptographic module, as described previously.

A communication software links the enterprise server directly with each vessel. The communication software is adapted to simultaneously handle multiple types of telemetry and protocols, which can include differing languages, differing types of data broadcast devices or remote terminal units, and differing manufacturers of system components. It is contemplated that the communication software can communicate with each vessel using a satellite signal, an acoustic signal, a radio frequency, a laser signal, or combinations thereof.

The communication software is contemplated to collect digital data relating to changes in measureable conditions relating to the vessel and initiate an alarm when the digital data signifies a change outside of a preset limit. The change can be a value, a status, or combinations thereof which are outside a preset limit. Preset limits can include deviations from a radius surrounding a specific area, deviation from a preset route, deviation from a geographic area, deviations in temperature, pressure, or humidity outside of a preset range, vibration beyond a preset tolerance, and other similar limits. The alarm can include a system wide notification, audio or visual signals, vibrations, other similar signals or alarms, and combinations thereof. It is contemplated that the alarm can be transmitted to a specific area, such as a radius surrounding a selected location, a geographical region, along a selected route, or to selected servers or selected devices in communication with selected servers.

It is contemplated that the communication software can continue communicating with each vessel during addition of a second enterprise server to the system. The communication software can also continue communication with each vessel during removal of an existing second enterprise server from the system. It is further contemplated that the communication software can continue communicating with each vessel while a new vessel is added to the system, or while an existing vessel is removed from the system. The communication software can also maintain communication with each vessel during addition and removal of remote terminal units from the system.

The present system also includes a configuration software, such as Autosol RTU Maintenance Environment (ARME) made by Automated Solutions of Houston, Tex., for selectively configuring and reconfiguring each remote terminal unit, each electronic cryptographic module, or combinations thereof. Configuration commands are contemplated to be communicated using the communication software.

The configuration software is contemplated to allow on-line reconfiguration of remote terminal units after deployment. The configuration software can be used for online configuring or online reconfiguring the at least one remote terminal unit with the at least one electronic cryptographic module, the enterprise server, or combinations thereof.

In an embodiment, the broadcast device can be contemplated to be in communication with the remote terminal unit and electronic cryptographic module, enabling the remote terminal unit to communicate with the enterprise server. In embodiment, the communication software can transmit communication commands and execute reconfiguration commands using the broadcast device on each vessel. In yet another embodiment, the broadcast device communicates to the remote terminal unit via the electronic cryptographic module.

The measured digital data collected by each remote terminal unit can be communicated to the enterprise server using communication software, and configuration commands from the enterprise server to each remote terminal unit. In an embodiment, communication between each remote terminal unit and the enterprise server can be selectively encrypted using the electronic cryptographic module. Simultaneously, using each data broadcast device, each vessel can simultaneously be tracked by the enterprise server.

In an embodiment, the present system can include a submersible vessel having a remote terminal unit for measuring an oceanic bottom environment. The submersible vessel is contemplated to include a broadcast device, enabling the submersible vessel to communicate directly with the enterprise server and other vessels.

Measurements obtained from oceanic bottom environments can be useful for detecting tsunami conditions and predicting tsunami occurrences, and other oceanic natural disasters, which can save thousands of lives. Measurements from oceanic bottom environments can also detect environmental contamination and other disruptions which can negatively impact marine life, contaminate seafood that could cause illness or death in humans, and similar maritime irregularities.

The present embodiments, also relate to a system for detecting changes in preselected measurable oceanic conditions that utilizes a plurality of vessels. Each vessel has a remote terminal unit having a sensor that collects digital data on oceanic conditions and stores digital data representative of this digital data in a memory area for transmission.

Communication software, adapted to simultaneously handle multiple differing types of telemetry and protocols associated with the vessels, as described previously, directly links each vessel to an enterprise server, and collects digital data on oceanic conditions from each vessel. The communication software can initiate an alarm when the digital data signifies tsunami conditions.

Configuration software, described previously, is used to selectively configure and reconfigure the remote terminal units. The configuration commands are communicated using the communication software.

The embodiment further includes a submersible vessel adapted to protect a remote terminal unit from an oceanic bottom environment. The submersible vessel includes a broadcast device, enabling the remote terminal unit of the submersible vessel to communicate directly with the enterprise server.

Referring now to FIG. 1, a diagram depicting the components of an embodiment of the present system is shown.

Enterprise server 10 is shown having a server processor 68 in communication with server memory area 70. While server memory area 70 is depicted within enterprise server 10, server memory area 70 could also be located remote from enterprise server 10 and in communication with enterprise server 10 using one or more networks, which can include use of network 20. Server memory area 70 could also include one or more removable data storage media.

The network 20 can be a local area network, a wide area network, a cellular network, a radio network, a plain old telephone network, a satellite network, a infrared network, a fiber optic network, a world wide network, such as the Internet, and combinations thereof.

Enterprise server 10 is also shown having a third cryptography chip 58c for selectively encrypting commands and requests for information transmitted to a first remote terminal unit 22, a second remote terminal unit 24, or submersible vessel remote terminal unit 62, and decrypting encrypted responses, information, or measurements from any of the remote terminal units. While the third cryptography chip 58c is depicted within enterprise server 10, third cryptography chip 58c could also be remote from enterprise server 10 and accessed using one or more networks, which can include use of network 20. The third cryptography chip 58c can also be contained within a removable data storage device that can communicate with enterprise server 10, such as through a universal serial bus port.

Server memory area 70 is depicted having communication software 38, which communicates with first remote terminal unit 22, second remote terminal unit 24, and submersible vessel remote terminal unit 62, and collects information 40, also shown stored in server memory area 70, relating to changes in preselected conditions within areas monitored by each remote terminal unit.

Server memory area 70 is further shown having configuration software 42, which selectively executes configuration and reconfiguration commands for first remote terminal unit 22, second remote terminal unit 24, and submersible vessel remote terminal unit 62. It is contemplated that the configuration and reconfiguration commands are transmitted using communication software 38. Configuration and reconfiguration commands for first intelligent electronic cryptographic module 26, second intelligent electronic cryptographic module 28, submersible vessel intelligent electronic cryptographic module 66, or combinations thereof can also be transmitted using communication software 38.

While FIG. 1 depicts first vessel 12 as a truck, first vessel 12 can be any type of vehicle, container, piece of equipment, individual, or other object. First vessel 12 is shown having a first data broadcast device 16 which is in communication with a network 20. The network 20 can be a satellite network; a cellular communication network; a secured network, such as a government network, or combinations thereof.

First data broadcast device 16 can include any type of data broadcast device, including radio frequency identification readers and transmitters, global positioning system transmitters, and other similar devices useable to track or determine the location of first vessel 12.

First data broadcast device 16 is shown in communication with a first remote terminal unit 22 disposed on first vessel 12. While first remote terminal unit 22 is depicted on first vessel 12, it is contemplated that first remote terminal unit 22 can be remote from first vessel 12 and in communication with first data broadcast device 16 using one or more networks, which can include use of network 20.

It is further contemplated that first remote terminal unit 22 can be in communication with multiple data broadcast devices within one or multiple vessels.

First remote terminal unit 22 is shown having a first memory area 34. First digital data 30 is shown stored within first memory area 34. First digital data 30 can be any type of data, measurement, information, collected by first remote terminal unit 22 or first data broadcast device 16. While first memory area 34 is depicted within first remote terminal unit 22, first memory area 34 can also be remote from first remote terminal unit 22 and in communication with first remote terminal unit 22 using one or more networks, which can include use of network 20. In an embodiment, first memory area 34 can include one or more removable data storage media.

First remote terminal unit 22 is depicted in communication with a first intelligent electronic cryptographic module 26. First intelligent electronic cryptographic module 26 is shown having a first cryptographic chip 58a for selectively encrypting responses and information transmitted to enterprise server 10, and for decrypting encrypted commands and requests for information transmitted by enterprise server 10.

While FIG. 1 depicts first intelligent electronic cryptographic module 26 disposed on first vessel 12, first intelligent electronic cryptographic module 26 can also be remote from first vessel 12, first remote terminal unit 22, or combinations thereof.

In a contemplated embodiment, first intelligent electronic cryptographic module 26 can be integral with first remote terminal unit 22, as a single unit, wherein first intelligent electronic cryptographic module 26 performs the functions of both first intelligent electronic cryptographic module 26 and first remote terminal unit 22 simultaneously.

It is further contemplated that a single intelligent electronic cryptographic module can communicate with multiple remote terminal units and selectively encrypt responses and information transmitted to enterprise server 10 and decrypt commands and requests for information transmitted to any of the remote terminal units.

First intelligent electronic cryptographic module 26 is depicted having a first cryptography chip 58a, for selectively encrypting information and responses from first remote terminal unit 22 and for decrypting encrypted commands and requests for information from enterprise server 10.

A first broadcast device 16 is shown disposed on first vessel 12 in communication with first intelligent electronic cryptographic module 26. While FIG. 1 depicts first broadcast device 16 on first vessel 12, first broadcast device 16 can also be remote from first vessel 12, first remote terminal unit 22, first intelligent electronic cryptographic module 26, or combinations thereof and in communication with one or more components of the present system using one or more networks, which can include use of network 20.

The first broadcast device 16 is contemplated to enable first remote terminal unit 22 to communicate directly with enterprise server 10 for transmitting information and responses to commands. Transmissions to and from enterprise server 10 are contemplated to utilize communication software 38. The first broadcast device 16 can also receive information and responses from submersible vessel remote terminal unit 62 for storing in first memory area 34 or transmitting to enterprise server 10.

FIG. 1 also depicts a second vessel 14. While FIG. 1 further depicts second vessel 14 as a ship, second vessel 14 can be any type of vehicle, including military vehicles, emergency vehicles, transportation vehicles, floating vessels, airplanes, and other moving vehicles. Second vessel 14 can also be an individual, a piece of equipment or other object, a container, or other similar objects.

Second vessel 14 is shown having a second data broadcast device 18, which can be the same type of device as first data broadcast device 16, or a different type of data broadcast device. Second data broadcast device 18 is shown in communication with network 20, for tracking and determining the location of second vessel 14.

Second data broadcast device 18 is shown in communication with second remote terminal unit 24 disposed on second vessel 14. While second remote terminal unit 24 is shown disposed on second vessel 14, second remote terminal unit 24 could also be remote from second vessel 14 and in communication with second data broadcast device 18 over one or more networks, which can include use of network 20. Second remote terminal unit 24 can simultaneously communicate with any number of data broadcast devices on any number of vessels.

Second remote terminal unit 24 is shown having a remote terminal unit processor 52 in communication with a second memory area 36. Second memory area 36 is depicted having second digital data 32, which can be any type of data, measurement, information, collected by second remote terminal unit 24 or second data broadcast device 18. While second memory area 36 is depicted within second remote terminal unit 24, second memory area 36 can also be remote from second remote terminal unit 24, and in communication with second remote terminal unit 24 using one or more networks, which can include use of network 20.

Second memory area 36 is also shown having generic encapsulation layer and automation software 48, which operates as a hardware interface layer containing communication programs enabling second remote terminal unit 24 to communicate with enterprise server 10. Programs within the generic encapsulation layer and automation software 48 can include timing programs, communication buffers, input/output scanners, memory management, real time clock, and power management routines.

Second memory area 36 is further shown having analog-to-digital converter 50 stored thereon, for converting measured data and information into selected formats for storage and/or transmission. While analog-to-digital converter 50 is depicted as software stored within second memory area 36, use of analog-to-digital conversion hardware is also contemplated.

Second memory area 36 is also shown having a command register 54, which is contemplated to be in communication remote terminal unit processor 52 for enabling remote terminal unit processor 52 to move digital representations into second memory area 36 when command register 54 contains an enabling communication command.

Second remote terminal unit 24 is shown in communication with a second intelligent electronic cryptographic module 28 via a bidirectional port 56. While second intelligent electronic cryptographic module 28 is shown disposed on second vessel 14, it is contemplated that second intelligent electronic cryptographic module 28 can also be remote from second vessel 14 and in communication with second remote terminal unit 24 using one or more networks, which can include use of network 20.

Second intelligent electronic cryptographic module 28 can also be integral with second remote terminal unit 24, the functions of the second intelligent electronic cryptographic module 28 and the second remote terminal unit 24 can be performed simultaneously, as a single unit.

Second intelligent electronic cryptographic module 28 can also be in communication with any number of remote terminal units for selectively encrypting and decrypting commands, responses, information, and requests for information.

Second intelligent electronic cryptographic module 28 is shown having a second cryptography chip 58b, for selectively encrypting information and responses transmitted by second remote terminal unit 24, and for decrypting encrypted commands and requests for information from enterprise server 10.

A second broadcast device 18 is shown disposed on second vessel 14 in communication with second intelligent electronic cryptographic module 28. While FIG. 1 depicts second broadcast device 18 disposed on second vessel 14, the second broadcast device 18 can also be remote from the second vessel 14, second remote terminal unit 24, second intelligent electronic cryptographic module 28, or combinations thereof and in communication with one or more components of the present system using one or more networks, which can include use of network 20.

Second broadcast device 18 is contemplated to enable second remote terminal unit 24 to communicate directly with enterprise server 10. Transmissions to and from enterprise server 10 are contemplated to utilize communication software 38. Second broadcast device 18 can also receive information and responses from submersible vessel remote terminal unit 62 for storing in second memory area 36 or transmitting to enterprise server 10.

FIG. 1 further depicts submersible vessel 60, which can be any kind of submersible vehicle, housing, equipment, or container able to contain a remote terminal unit and protect the remote terminal unit from an oceanic bottom environment.

Submersible vessel 60 can optionally include one or more data broadcast devices for tracking and determining the location of submersible vessel 60.

Submersible vessel 60 is shown having a submersible vessel remote terminal unit 62 disposed therein. Submersible vessel remote terminal unit 62 can include any combination of processors, memory areas, analog-to-digital converters, generic encapsulation layer and automation software, ports, and cryptographic hardware, as described previously.

A submersible vessel broadcast device 64 is shown disposed on submersible vessel 60, for enabling submersible vessel remote terminal unit 62 to transmit information and responses to enterprise server 10 and receive commands and requests for information from enterprise server 10.

Submersible vessel remote terminal unit 62 is shown in communication with a submersible vessel intelligent electronic cryptographic module 66. Submersible vessel intelligent electronic cryptographic module 66 is depicted remote from submersible vessel 60, however submersible vessel intelligent electronic cryptographic module 66 can also be disposed within submersible vessel 60, or integral with submersible vessel remote terminal unit 62, as described previously.

Submersible vessel intelligent electronic cryptographic module 66 is shown having a fourth cryptography chip 58*d*, for selectively encrypting information and responses transmitted from submersible vessel remote terminal unit 62 and decrypting encrypted commands and requests for information transmitted by enterprise server 10.

It is contemplated that submersible vessel broadcast device 64 enables submersible vessel remote terminal unit 62 to communicate directly with enterprise server 10. Submersible vessel broadcast device 64 can also enable submersible vessel remote terminal unit 62 to communicate with first remote terminal unit 22 and the second remote terminal unit 24, or combinations thereof, which can store information or responses transmitted by submersible vessel remote terminal unit 22, transmit the information or responses to enterprise server 10, or combinations thereof.

Figure 2:
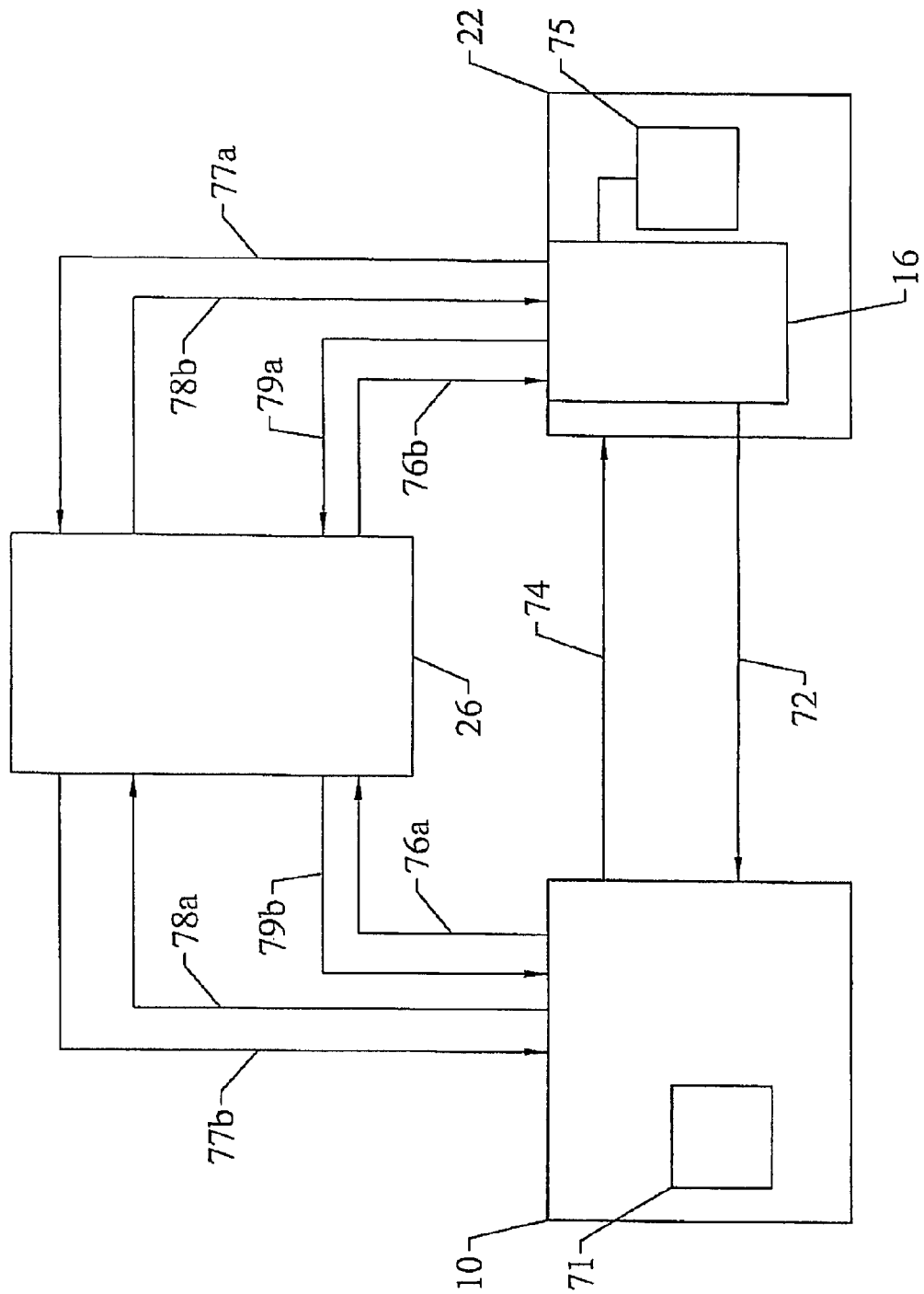
FIG. 2 depicts an embodiment of the a first remoter terminal unit communicating with an enterprise server.

FIG. 2, depicts an embodiment of the first remote terminal unit 22 communicating with the enterprise server 10. In this embodiment, the first data broadcast device 16 is integrated with the first remote terminal unit 22.

In communication path 72 the first data broadcast device 16 is sending digital data to the enterprise server 10, directly from the first remote terminal unit 22 to the enterprise server 10, without the use of the first intelligent electronic cryptographic module 26. The data sent through communication path 72 can be uploaded by the enterprise server 10. The communication software would check for changes in measureable conditions.

The at least one enterprise server 10 can have authenticating computer instructions 71 for authenticating an identification of each remote terminal unit prior to receiving digital data from the at least one remote terminal unit. For example before the enterprise server 10 receives digital data through communication path 72, the enterprise server 10 would use authenticating computer instructions 71 for authenticating that the first remote terminal unit 22 is authorized to communicate with the enterprise server 10.

In communication path 74 the enterprise server 10 is communicating with the first remote terminal 22. The enterprise server 10 could be requesting digital data from the first remote terminal unit 22, configuring the first remote terminal unit 22, reconfiguring the first remote terminal unit 22, issuing a command to the first remote terminal unit 22 to temporally go offline, or combinations thereof. The communication sent through the communication path 74 bypasses the first intelligent electronic cryptographic module 26.

The remote terminal units can have verifying computer instructions 75 for verifying an identification of the enterprise server 10 prior to transmitting digital data. For example, each remote terminal unit in communication with the enterprise server 10 would have verifying computer instructions 75 to verify that the enterprise server 10 is authorized to communicate with the first remote terminal unit 22, before the first remote terminal unit 22 would respond to the enterprise server's 10 request for digital data, command, or transmission of digital data.

The authenticating computer instructions 71 stored on the enterprise server 10 can be adapted to simultaneously authenticate the first remote terminal unit 22 while the verifying computer instructions 75 verifies the identity of the enterprise server 10.

Additional, the authenticating computer instructions 71 can simultaneously authenticate the identity of a plurality of remote terminal units, and the verifying computer instructions 75 can verify the identity of a plurality of enterprise servers simultaneously.

In communication path 76*a* the enterprise server 10 is sending a request to the first remote terminal unit 22. The communication sent on path 76*a* is selectively encrypted by the first intelligent electronic cryptographic module 26. The communication then travels from the first intelligent electronic cryptographic module 26 to the first remote terminal unit 22. The first remote terminal unit 22 would receive encrypted communication form communication path 76*b*.

The first remote terminal unit 22 can also send data to the enterprise server 10 along communication path 79*a*. The data sent along communication path 79*a* would be selectively encrypted by the first intelligent electronic cryptographic module 26. After selective encryption the data would travel along communication path 79*b* to the enterprise server 10. Once at the enterprise server 10, the enterprise server 10 would act upon the data.

Communication path 78*a* represents the communication path for digital data or request sent from the enterprise server 10 to the first intelligent electronic cryptographic module 26. The digital data or request from the enterprise server 10 can go through the first intelligent electronic cryptographic module 26. Along this path the first intelligent electronic cryptographic module 26, allows the digital data or request to pass through without encryption. The first remote terminal unit 22 would then receive the data or request unencrypted from communication path 78*b*.

Communication path 77*a* represents the first data broadcast device 16 sending data or digital data to the enterprise server 10 through the first intelligent electronic cryptographic module 26. The data would pass through the first intelligent electronic cryptographic module 26 with out being encrypted and would be sent to the enterprise server 10 along communication path 77*b* as unencrypted digital data.

It is contemplated that other communication paths could be created and that multiple intelligent electronic cryptographic modules could be used. For example the first data broadcast device 16 could send digital data or receive encrypted digital data from a secondary intelligent electronic cryptographic module, and then transfer the data to the enterprise server 10 through the first intelligent electronic cryptographic module 26. And the first intelligent electronic cryptographic module 26 could decrypt the data and send unencrypted data to the enterprise server 10.

Further, the enterprise server 10 could be in communication with several data broadcast devices and electronic cryptographic modules. In the alternative, the enterprise server could be in communication with only one electronic cryptographic module, and the intelligent electronic cryptographic module could be in communication with several data broadcast devices.

Figure 3:
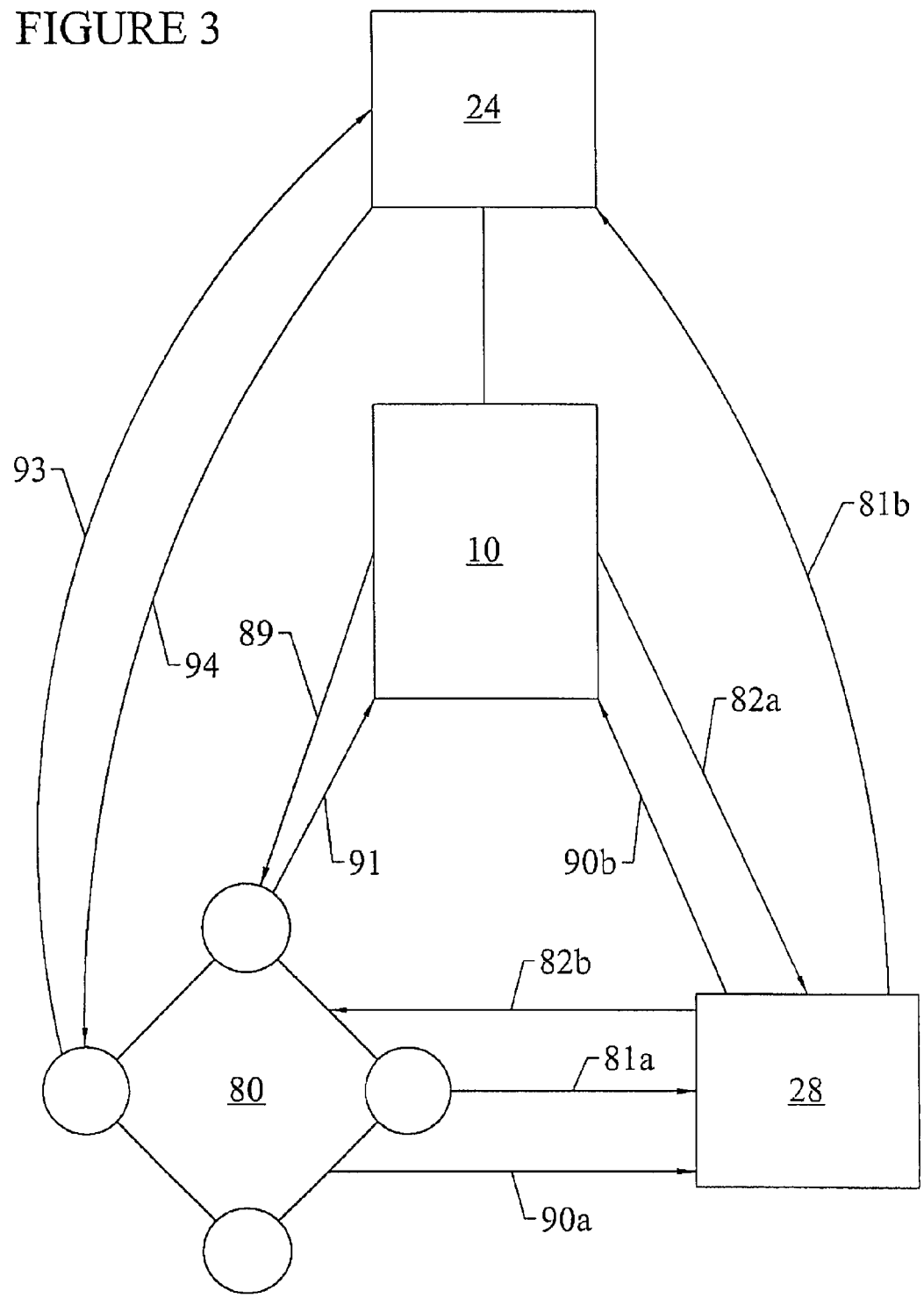
FIG. 3 depicts a remote terminal unit and a network of remote terminal units in communication with an enterprise server.

FIG. 3 represents the enterprise server in communication with the second remote terminal unit 24. Further the second remote terminal unit 24 and the enterprise server 10 are in communication with a second intelligent electronic cryptographic module 28 and a network of remote terminal units 80. The network of remote terminal units 80 can be a plurality of remote terminal units linked together to perform a common task.

The enterprise server 10 can send digital data, a request for digital data, or a command along path 82a through the second intelligent electronic cryptographic module 28. The digital data would be selectively encrypted or decrypted then sent to the network of remote terminal units 80 along path 82b.

The network of remote terminal units 80 can also send digital data, a request for digital data, or a command to the second remote terminal unit 24. The communication can travel along communication path 81a to the second intelligent electronic cryptographic module 28. Then the second intelligent electronic cryptographic module 28 would selectively encrypt or un-encrypt the communication and send the communication along communication path 81b to the second remote terminal unit 24.

The second remote terminal unit 24 could also speak directly with the network of remote terminal units 80 without the use of the second intelligent electronic cryptographic module 28.

The network of remote terminal units 80 can also speak to the enterprise server 10 along communication path 90a and 90b. The communication path 90a is from the network of remote terminal units 80 to the second intelligent electronic cryptographic module 28. The communication path 90b is from the second intelligent electronic cryptographic module 28 to the enterprise server 10.

The enterprise server 10 can send a communication directly to the network of remote terminal units 80 along communication path 89. The network of remote terminal units 80 can send communication directly to enterprise server 10 along communication path 91.

The network of remote terminal units 80 can communicate directly with the second remote terminal unit 24 using communication path 93. The second remote terminal unit 24 can communicate with the network of remote terminal units 80 along communication path 94.

Figure 4:
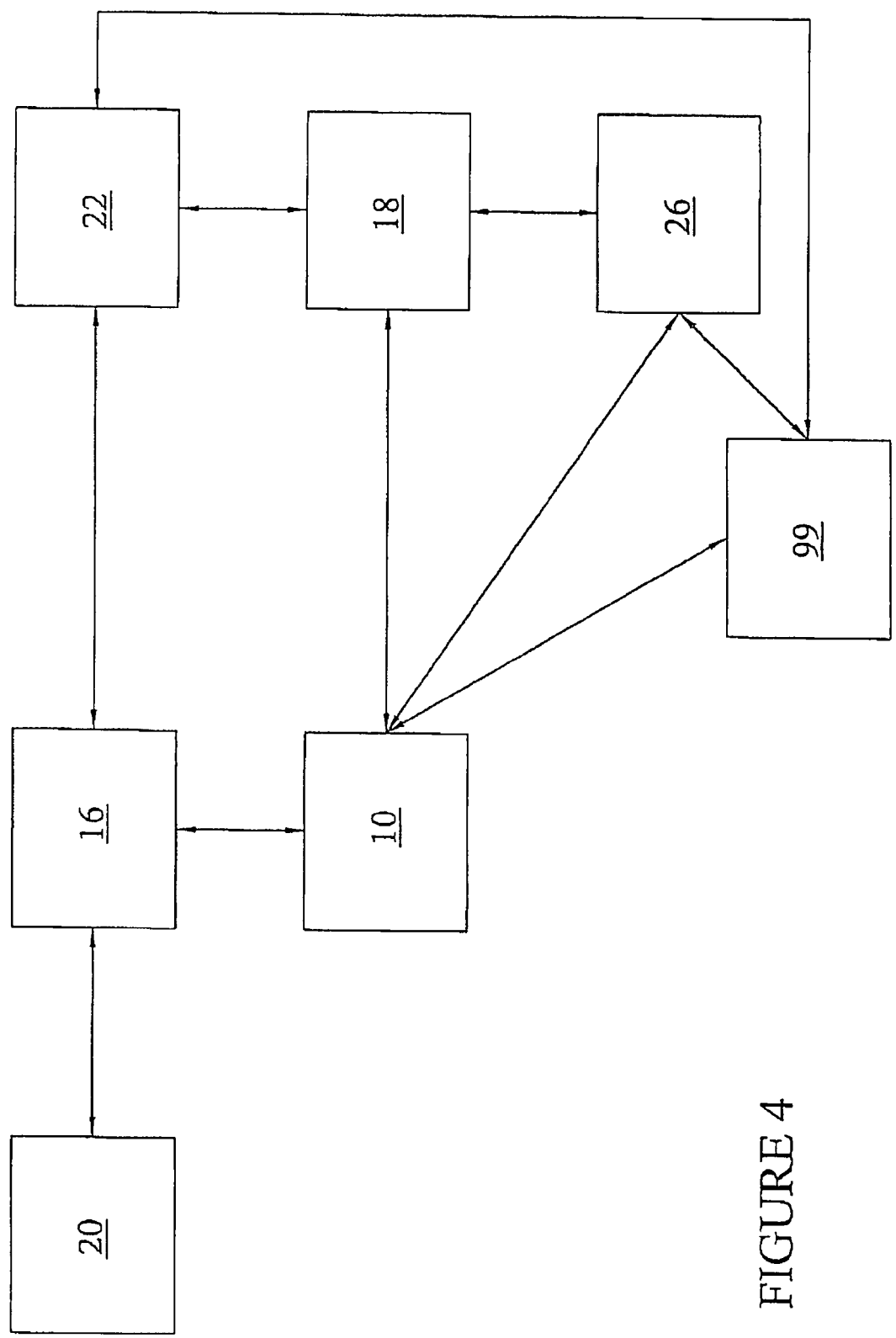
FIG. 4 depicts an alternative embodiment of the system.

FIG. 4 depicts another embodiment of the system. In the depicted embodiment the first data broadcast device 16 receives a communication from the network 20. The first data broadcast device 16 sends the digital data to the first remote terminal unit 22. The first data broadcast device 16 is also in two way communication with the enterprise server 10. The first remote terminal unit 22 is in communication with the enterprise server 10 using the second data broadcast device 18. The communication paths can be the same as described in FIGS. 2 and 3.

The second data broadcast device 18 is in simultaneous communication with a second remote terminal unit 26. The second remote terminal unit 26 has an additional data broadcast device 99 in communication with the enterprise server 10 and the first remote terminal unit 22.

It would also be possible for the network 20 to be in two way communication directly with any of the remote terminal units and/or the enterprise server 10. Additionally, the first data broadcast device 16 can be in direct simultaneous communication with each of the remote terminal units and the enterprise server 10.

While these embodiments have been described with emphasis on the embodiments, it should be understood that within the scope of the appended claims, the embodiments might be practiced other than as specifically described herein.

What is claimed is:

1. A system for simultaneously collecting data and detecting changes on measurable conditions and for sending commands to control, online configure, and online reconfigure remote terminal units and remote terminal unit functions using communications with a supervisory control and data acquisition system, wherein the system comprises:
   a. at least one enterprise server in communication with a network by using communication with the supervisory control and data acquisition system;
   b. at least one vessel;
   c. at least one data broadcast device in communication with the at least one enterprise server, the network, and the at least one vessel;
   d. at least one remote terminal unit in communication with the at least one broadcast device and the at least one vessel, and wherein the at least one remote terminal unit simultaneously collects data and detects changes on the measurable conditions relating to the at least one vessel, and wherein the at least one remote terminal unit is in communication with at least one electronic cryptographic module; wherein the at least one remote terminal unit further comprises: an analog-to-digital converter for converting the data into a digital data; a memory area for storing the digital data; at least one processor in communication with the analog-to-digital converter and the memory area, wherein the at least one processor operates upon the digital data according to a predetermined function, and wherein the at least one processor selectively moves the digital data to the memory area; a command register for storing communication commands, wherein the command register is in communication with the at least one processor such that the at least one processor moves the digital data to the memory area when the command register contains an enabling communication command; and at least one bidirectional port in communication with the communication software and at least one the enterprise server for transmitting the digital data to the at least one enterprise server from the at least one remote terminal unit via the communication software, wherein the at least one bidirectional port receives the digital data from the communication software;
   e. communication software linking the at least one enterprise server with the at least one vessel, wherein the communication software is adapted to simultaneously handle multiple types of telemetry and multiple different protocols associated with the at least one vessel, and wherein the communication software initiates an alarm when the data collected is outside a preset limit and sends commands to control, online configure, and online reconfigure the at least one remote terminal unit and remote terminal unit functions; and
   f. a configuration software for online configuring and online reconfiguring of the at least one remote terminal unit and a member of the group consisting of: the at least one electronic cryptographic module, the at least one enterprise server, or combinations thereof, and wherein online configuring and online reconfiguring are communicated using the communication software.

2. The system of claim 1, further wherein the electronic cryptographic module encrypts communication to the at least one remote terminal unit, the at least one enterprise server or combinations thereof.

3. The system of claim 1, wherein the measurable conditions related to the at least one vessel comprise: changes in pressure, changes in location of the at least one vessel, changes in location of the at least one vessel relative to a predefined location, changes in location of the at least one vessel relative to a predefined position, changes in temperature, changes in the location of the at least one vessel relative to an identified secondary location, changes in altitude, and combinations thereof.

4. The system of claim 1, wherein the at least one vessel is a member of the group consisting of: a semisubmersible platform, a submersible vessel, a floating vessel, an armed vehicle, a moving vehicle, a deep draft cassion vessel, a ship, a truck, an automobile, a bus, a train, a plane, an individual, an animal, a container on a vessel, a fuel tank, a piece of equipment, and combinations thereof.

5. The system of claim 1, wherein the at least one remote terminal unit is selected from the group consisting of: a sensor with a transmitter, a radio frequency identification tag with an activator and a receiver, a bar code with a bar code reader, a status switch, a global positioning system receiver and transmitter, a portable data acquisition system, and acoustic recording device, a vibration monitoring device, a video monitoring device, and combination thereof.

6. The system of claim 5, wherein the sensor is a member of group consisting of: a pressure sensor, a temperature sensor, a salinity sensor, a hydrocarbon sensor, a radiation sensor, a biometric sensor to read biometric data, a hazardous material sensor, a weight sensor, a distance sensor, a radio frequency identification sensor, a bard code sensor, a motion detecting sensor, an anemometer, an accelerometer, an altimeter, or combinations thereof.

7. The system claim 1, wherein the communication software continues communicating with a member of the group consisting of: the at least one vessel, the at least one remote terminal unit, or combinations thereof, while a second enterprise server is added to the system.

8. The system claim 1, wherein the communication software continues communicating with a member of the group consisting of: the at least one vessel, the at least one remote terminal unit, or combinations thereof, while a second enterprise server is removed from the system.

9. The system claim 1, wherein the communication software continues communicating with a member of the group consisting of: the at least one vessel, the at least one remote terminal unit, or combination thereof, while another vessel is added to the system.

10. The system claim 1, wherein the communication software continues communicating with a member of the group consisting of: the at least one vessel, the at least one remote terminal unit, or combination thereof, while a vessel is removed from the system.

11. The system claim 1, wherein the at least one remote terminal unit continues to collect data while receiving communication commands, configuration commands, reconfiguration commands, or combinations thereof, from the communication software.

12. The system claim 1, wherein the at least one remote terminal unit further comprises software.

13. The system of claim 1, wherein the electronic cryptographic module comprises a cryptography chip for decrypting communications from a member of the group: the at least one enterprise server, the at least one remote terminal unit, or combinations thereof, and for encrypting communications from a member of the group: the at least one remote terminal unit, the at least one enterprise server and combinations thereof.

14. The system of claim 1, further comprising a submersible vessel comprising a second remote terminal unit for measuring an oceanic bottom environment, wherein the submersible vessel comprises a second broadcast device, and wherein the second broadcast device enables the second remote terminal unit to communicate directly with the at least one enterprise server through the remote terminal unit and broadcast device.

15. The system of claim 1, wherein the network is selected from the group: a local area network, a wide area network, a cellular network, a radio network, a plain old telephone network, a satellite network, an infrared network, a fiber optic network, a world wide network, and combination thereof.

16. The system of claim 1, wherein the at least one vessel is a plurality of vessels and each vessel has a remote terminal unit.

17. The system of claim 1, wherein the at least one enterprise server comprises computer instructions for authenticating an identification of each remote terminal unit prior to receiving digital data from the at least one remote terminal unit.

18. The system of claim 1, wherein the remote terminal unit comprises computer instructions for verifying identification of each enterprise server prior to transmitting digital data.

19. The system of claim 1, further comprising computer instructions for simultaneously authenticating the at least one remote terminal unit while verifying identification of the at least one enterprise server.

* * * * *